US006947924B2

(12) United States Patent
Bates et al.

(10) Patent No.: US 6,947,924 B2
(45) Date of Patent: Sep. 20, 2005

(54) GROUP BASED SEARCH ENGINE GENERATING SEARCH RESULTS RANKING BASED ON AT LEAST ONE NOMINATION PREVIOUSLY MADE BY MEMBER OF THE USER GROUP WHERE NOMINATION SYSTEM IS INDEPENDENT FROM VISITATION SYSTEM

(75) Inventors: Cary Lee Bates, Rochester, MN (US); Brian John Cragun, Rochester, MN (US); Paul Reuben Day, Rochester, MN (US); David Richard Poulter, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/041,933

(22) Filed: Jan. 7, 2002

(65) Prior Publication Data

US 2003/0131000 A1 Jul. 10, 2003

(51) Int. Cl.[7] .............................................. G06F 17/30
(52) U.S. Cl. ............................ 707/3; 707/9; 707/104.1; 709/203
(58) Field of Search ............... 707/1–8, 10, 100–104.1; 715/501.1, 510–513; 709/203–210; 713/200–202; 705/25–28; 706/45–50

(56) References Cited

U.S. PATENT DOCUMENTS 5,855,020 A * 12/1998 Kirsch .......................... 707/10
5,920,854 A * 7/1999 Kirsch et al. ................... 707/3

(Continued)

FOREIGN PATENT DOCUMENTS

EP           1050830 A2 * 11/2000   ..................... 17/30
WO          WO 02/061628   * 8/2002 ..................... 17/30

OTHER PUBLICATIONS

Jin–gang Kim, et al. "intelligent information recommend system on the Internet",Parallel processing, 1999 proceedings, 1999 internatiional workshops on, Sep. 1999, pp 376–380.*
Karin Schmidt, et al. "A generic system for web–based group interaction", System sciences, 1998, proceedings of the thirty first Hawaii international conference, Jan 1998, pp 545–554, vol 1.*
Rajeev Kumar Mishra et al. "Khoj Yantra: an integrated MetaSearch engine with classifcation, clustering and ranking", Databas engineering and applications ysmposium, 2000 international, Sep. 2000, pp 122–133.*
"User groups", copyright 2004, by user group relations, 2 pages.*
ResearchBuzz, "Private search engine from TopClick", Feb. 22, 2000, 3 pages.*
Bob Burt, "searchPad 1.1", PC update Online! The magazine of the melbourne PC user Group, reprinted from the May 1998 issue of PC update, 4 pages.*
David B Leake e t al. "Selecting task–relevant sources for just–in–time retrieval", AAAI–99 workshop on intelligent information systems, 1999, 6 pages.*
U.S. Appl. No. 60/275,068 filed on Mar. 12, 2001 [copy was not readily available].*

Primary Examiner—Srirama Channavajjala
(74) Attorney, Agent, or Firm—Michael F. Hoffman; Hoffman, Warnick & D'Alessandro LLC (57) ABSTRACT

A search system and method for performing group-based searches. The system comprises a client system having a browser and a search engine plug-in, wherein the search engine plug-in allows group members to generate nomination data by nominating web pages; and a server having a control program and a group structure for storing nomination data, wherein the control program generates a primary search result list based on a search index, and further refines the search result list based on the stored nomination data.

29 Claims, 12 Drawing Sheets

U.S. PATENT DOCUMENTS

| | | | |
|---|---|---|---|
| 6,070,159 A | 5/2000 | Wilson et al. | 707/3 |
| 6,185,558 B1 * | 2/2001 | Bowman et al. | 707/5 |
| 6,185,576 B1 | 2/2001 | McIntosh | 700/200 |
| 6,256,623 B1 * | 7/2001 | Jones | 707/3 |
| 6,275,820 B1 * | 8/2001 | Navin-Chandra et al. | 707/3 |
| 6,278,992 B1 * | 8/2001 | Curtis et al. | 707/3 |
| 6,327,590 B1 * | 12/2001 | Chidlovskii et al. | 707/5 |
| 6,397,212 B1 * | 5/2002 | Biffar | 707/5 |
| 6,480,885 B1 * | 11/2002 | Olivier | 709/207 |
| 6,487,584 B1 * | 11/2002 | Bunney | 709/206 |
| 6,493,702 B1 * | 12/2002 | Adar et al. | 707/3 |
| 6,519,585 B1 * | 2/2003 | Kohli | 707/3 |
| 6,560,588 B1 * | 5/2003 | Minter | 706/50 |
| 6,636,853 B1 * | 10/2003 | Stephens, Jr. | 707/10 |
| 6,665,655 B1 * | 12/2003 | Warner et al. | 707/2 |
| 6,721,729 B2 * | 4/2004 | Nguyen et al. | 707/3 |
| 6,728,704 B2 * | 4/2004 | Mao et al. | 707/3 |
| 6,742,032 B1 * | 5/2004 | Castellani et al. | 709/224 |
| 6,829,599 B2 * | 12/2004 | Chidlovskii | 707/3 |
| 6,847,963 B1 * | 1/2005 | Paclat | 707/5 |
| 2002/0042733 A1 * | 4/2002 | Lesandrini et al. | 705/10 |
| 2002/0042789 A1 * | 4/2002 | Michalewicz et al. | 707/3 |
| 2002/0065857 A1 * | 5/2002 | Michalewicz et al. | 707/532 |
| 2002/0107725 A1 * | 8/2002 | Hickey et al. | 705/12 |
| 2003/0014399 A1 * | 1/2003 | Hansen et al. | 707/3 |
| 2003/0088554 A1 * | 5/2003 | Ryan et al. | 707/3 |
| 2003/0131000 A1 * | 7/2003 | Bates et al. | 707/7 |
| 2004/0111423 A1 * | 6/2004 | Irving et al. | 707/100 |

* cited by examiner

GROUP BASED SEARCH ENGINE GENERATING SEARCH RESULTS RANKING BASED ON AT LEAST ONE NOMINATION PREVIOUSLY MADE BY MEMBER OF THE USER GROUP WHERE NOMINATION SYSTEM IS INDEPENDENT FROM VISITATION SYSTEM

BACKGROUND OF THE INVENTION

1. Technical Field

The present invention relates generally to web-based search engines, and relates more particularly to a search engine system and method having group-based searching capabilities.

2. Related Art

Internet search engines provide an indispensable service of locating relevant web sites for web users. Unfortunately, search results provided by modern search engines often include too many sites to efficiently sort through. Narrowing down the search results to return better quality and fewer sites is a daunting task, especially considering the great number of web sites that continue to be added to the web. To address this, technologies have been implemented to provide better search strategies, typically by better managing the large amount of data being searched.

U.S. Pat. No. 6,070,159, "Method and Apparatus for Expandable Biometric Searching," issued on May 30, 2000 to Wilson et al., which is hereby incorporated by reference, discloses a searching method that assigns data to a data group and then to a search engine. The result is a system for efficiently storing data in a large database so that it can be more easily matched using biometric data (e.g., fingerprints, facial shapes, etc.).

U.S. Pat. No. 6,185,576, "Defining a Uniform Subject Classification System Incorporating Document Management/Record Retention Functions," issued on Feb. 6, 2001 to McIntosh, which is hereby incorporated by reference, discloses a technique for classifying documents by their subject in order to better manage the life cycle of each document.

While these disclosures provide improved mechanisms for managing and retrieving data, none provide end users with specific functions that will improve data searching, particularly when searching web pages on the internet.

SUMMARY OF THE INVENTION

The present invention addresses the above-mentioned problems, as well as others, by providing a search engine system that allows an end user within a group to improve search results for other users within the group. In a first aspect, the invention provides a group-based search engine for locating web pages, comprising: a system for associating a user group with a web search; and a search system for generating a list of search results ordered by a ranking in response to the web search, wherein the ranking is based on at least one nomination previously made by a member of the user group.

In a second aspect, the invention provides a program product stored on a recordable medium for interfacing with a search engine to return a list of search results, comprising: means for registering with a group; means for submitting a search string to the search engine; means for viewing the list of search results based on a ranking, wherein any search result previously nominated by a group member as a high priority is ranked above un-nominated search results; and means for nominating a current search result from the list of search results.

In a third aspect, the invention provides a search system for performing group-based searches, comprising: a client system having a browser and a search engine plug-in, wherein the search engine plug-in allows group members to generate nomination data by nominating web pages; and a server having a control program and a group structure for storing nomination data, wherein the control program generates a primary search result list based on a search index, and further refines the search result list based on the stored nomination data.

In a fourth aspect, the invention provides a method for performing a group-based search, comprising the steps of: providing a browser and a search engine plug-in on a client system; logging in as a member of a group using the browser; submitting a search request to a search engine server; searching a search index and returning a primary search result list; and refining the primary search result list based on nomination data collected from members of the group.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

The present invention provides a search engine system and method that allow a particular group of people, such as a family, club, or organization, to form a group-based search community. Based on actions of the group members, "nomination" data is collected and stored by the search engine system. The data is then utilized by the search engine system to refine search results generated by traditional search engines (e.g., Yahoo™, Google™, etc.). As described in detail below, members of a group generate nomination data by "nominating" web pages that they believe, for example, should be ranked with a high priority in future search results, excluded from future search results, or made available in future searches only to group members. The system also collects "visitation" data from the group members regarding commonly or recently visited web pages, and presents that data back to members when they perform searches.

Figure 1:
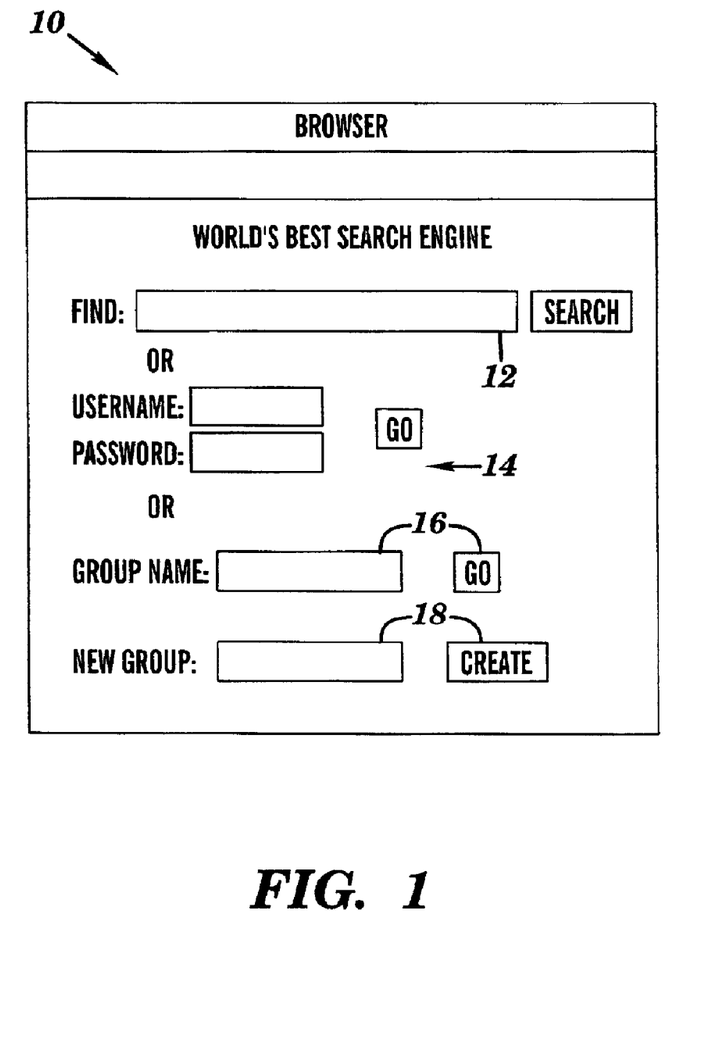
FIG. 1 depicts a main page of a search engine system in accordance with an embodiment of the present invention.

Referring to the figures, FIG. 1 depicts a main web page 10 that is brought up when a user first visits a search engine web page in accordance with the present invention. At main page 10, the user is presented with several options. The first option is to perform a standard search (as is commonly done on known web search sites) by entering key words in a key word window 12. The second option is to search as a logged in group member (i.e., perform a group-based search) by first entering a user name and password 14. If the user selects this option, and is recognized as a member, a group search page will be displayed (described below with reference to FIG. 2). As will be described, group-based searching associates a search with a group in order to, for instance, have the search engine give nominated pages priority, nominate pages, have private pages listed in the search results, see which pages other group members have visited, and have undesirable pages excluded from the search results.

As a third option, the user can search in conjunction with an identified group by entering only a group name 16 (i.e., perform a restricted group-based search). By entering a group name only, the user will not search as a member, but will still have the search associated with a group and enjoy limited benefits of a group-based search. In a restricted group-based search, pages nominated as having a high priority will still be listed first, and pages nominated as undesirable will still be excluded from the search results. However, without logging in as a group member, the user cannot, for example, nominate pages, see private pages, or see where other group members have visited. When just the group name is submitted at the main window 10, a new page (not shown) would appear that would allow the user to perform a restricted group-based search.

As a final option in main page 10, the user can create a new group by entering a new group name 18 and pressing the create button. It should be understood that the format, number, and arrangement of the web pages described herein are for exemplary purposes only, and many variations could exist without departing from the scope of the invention.

Figure 2:
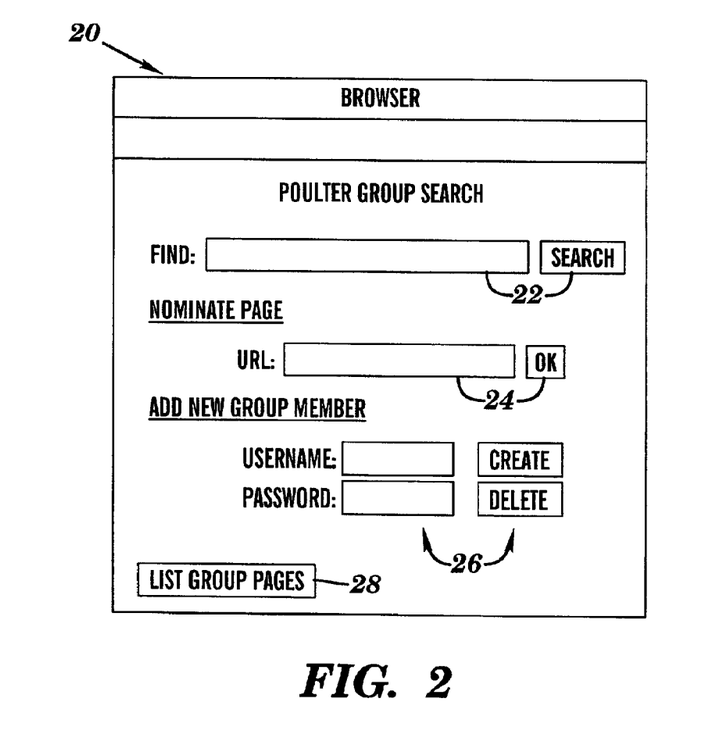
FIG. 2 depicts a group member search page in accordance with an embodiment of the present invention.

Referring now to FIG. 2, a group search page 20 is presented representative of a web page that would be displayed after a group member logs in. As shown, group search page 20 provides several options. The first option allows group members to perform a group-based search 22 by entering keywords into the search window. When the user takes this action, the search system refines the search results based on previously collected nomination and visitation data. As a second option, the user can also nominate a web page or URL 24, which will bring up a nomination web page, described below with reference to FIG. 6. As a third option, the user can add a new member to (or delete an existing member from) their group 26 by specifying a username and password for the new member. As a fourth option, the user can list all of the pages currently nominated by the group 28. This list could be used, for instance, as a shared "bookmark" list for the group.

Figure 3:
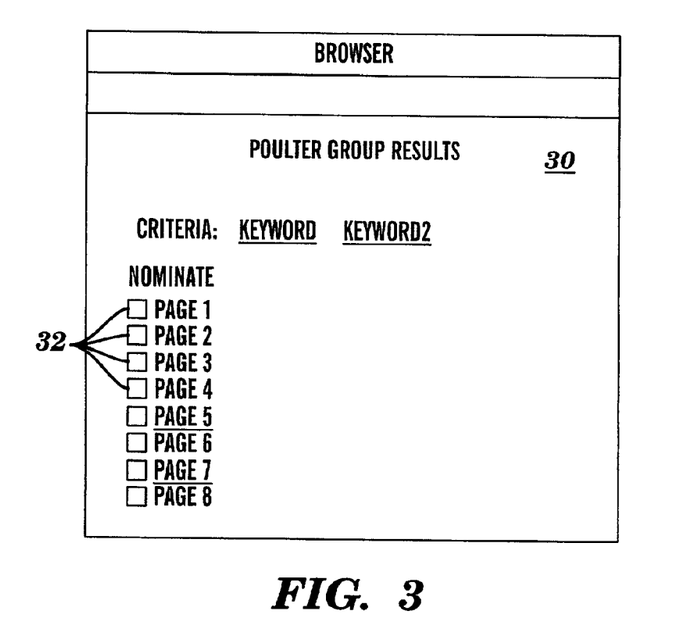
FIG. 3 depicts a group search result page in accordance with an embodiment of the present invention.

Referring now to FIG. 3, an exemplary search results page 30 for a group-based search is shown that lists eight results (page 1–page 8). As is known in the art, each result may comprise a hyperlink to a web page that can be linked to by clicking on the individual result. In addition to clicking a link, the user can nominate one of the search results (typically after the paged has been viewed) by clicking a nomination box 32 next to the listed results. Clicking the nomination box will cause the nomination page to be displayed, as described below with reference to FIG. 6.

As shown in the exemplary results, result pages 1, 5 and 7 have been highlighted. In particular, page 1 is highlighted as bold because it was previously nominated by one or more group members as being of a high priority. Pages 5 and 7 are highlighted (i.e., underlined) because other group members have recently visited these pages. It should be recognized that any type of highlighting may be used (e.g., italics, colored fonts, etc.). In the case where a user performed a restricted group-based search, nominate boxes 32 would not appear, and pages 5 and 7 would not be shown as highlighted.

Figure 4:
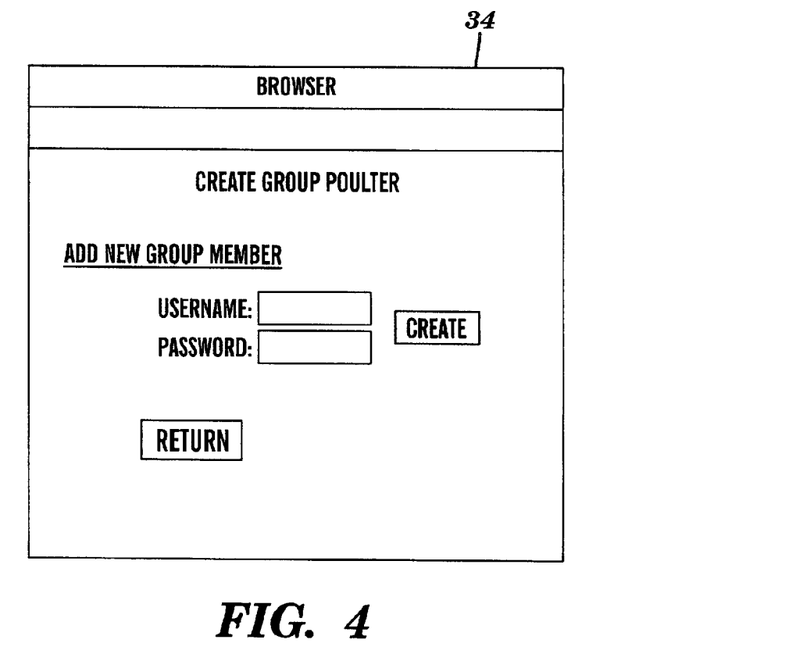
FIG. 4 depicts a new group creation web page in accordance with an embodiment of the present invention.

Referring now to FIG. 4, a group creation page 34 is depicted. Page 34 would be brought up after a user decided to create a new group from the main page 10 (FIG. 1). In this case the group created is titled the Poulter Group. From this page 34, the user can add new members and create ID's for the various group members.

Figure 5:
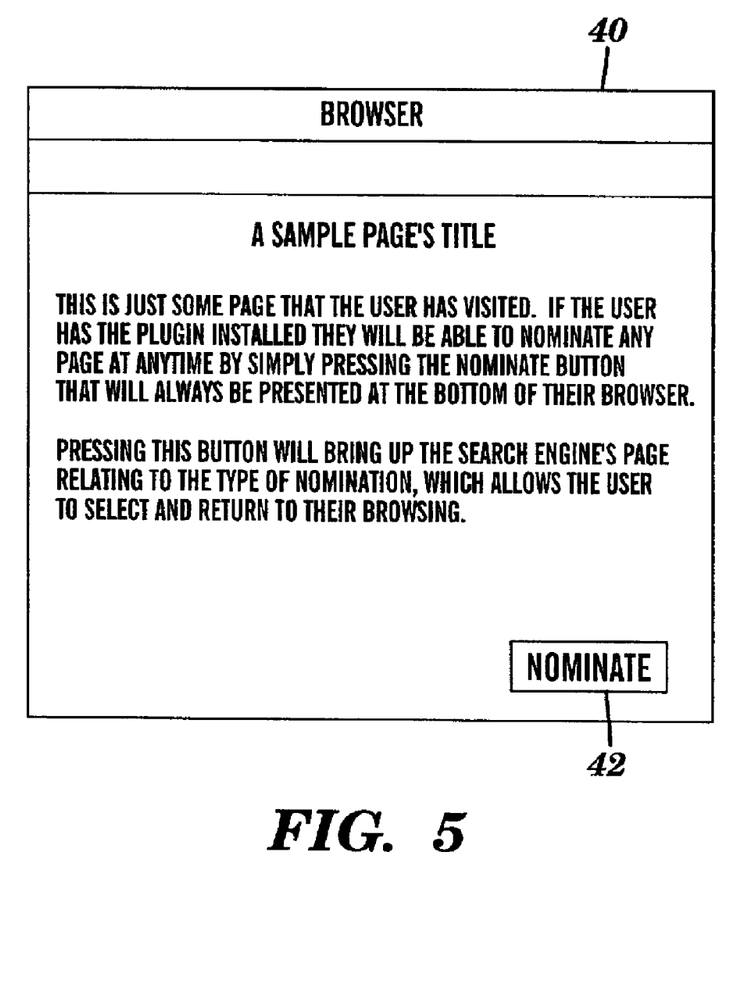
FIG. 5 depicts a sample web page having a nominate button in accordance with an embodiment of the present invention.

Referring now to FIG. 5, a sample web page 40 is shown comprising a nominate button 42 embedded within the page (or elsewhere within the browser). The nominate button 42 appears in response to a plug-in installed on the client's computer and can be set up to appear regardless of how the user navigated to the page. Pressing the nominate button 42 will cause the nomination page to be displayed and allow the user to nominate the page (as described below).

Figure 6:
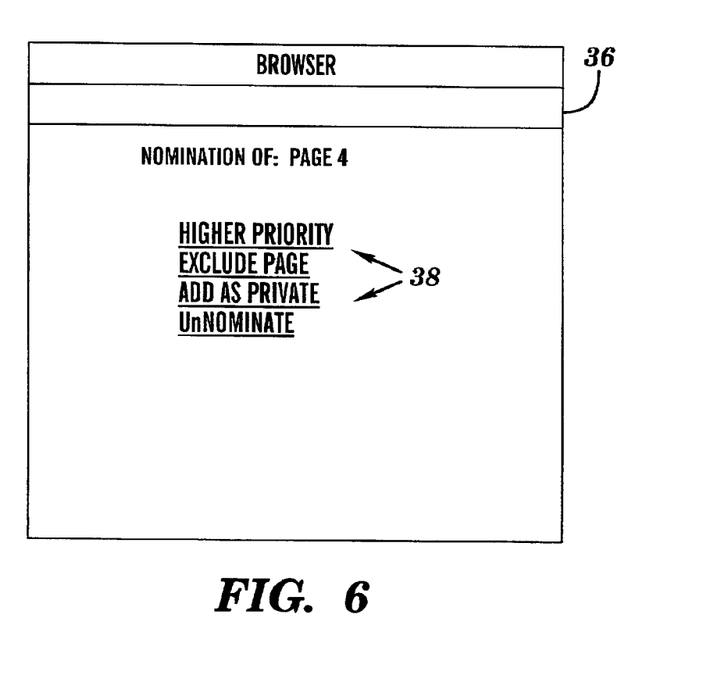
FIG. 6 depicts a nomination web page in accordance with an embodiment of the present invention.

Referring now to FIG. 6, a nomination page 36 is depicted and would be presented whenever a member desired to nominate a particular web page. Nomination page 36 would be brought up either when the member checked a nomination box 32 (FIG. 3) from a list of search results, when the member typed in a URL 24 from the group search page 20 (FIG. 2), or when the member pressed the nominate button 42, as shown in FIG. 5. In this exemplary embodiment, there are four nomination options 38. The first nomination option "Higher priority," allows the member to identify the selected page as having a higher priority, which tells the search engine that when all else is equal with respect to a search criteria, list this page first in future search results.

The second nomination option, "Exclude page" causes the search engine to exclude listing the selected page in any search results. This feature is useful in the event a group member does not want others in the group to visit a certain site, e.g., because the site is undesirable. Safeguard options, so that one member in the group cannot exclude all other members from a site, may include user override of excluded sites, the use of notices that a given site was excluded as undesirable by a given member, etc.

The third nomination option, "Add as private," tells the search engine to only list the selected page when the search is performed by a logged in member (i.e., a group-based search). Note that it is presumed that any private pages will not exist in the main index of the search engine. Finally, the last option is the un-nominate option which will act to remove any previous nominate action and simply make it look like the identified page was never nominated.

Figure 7:
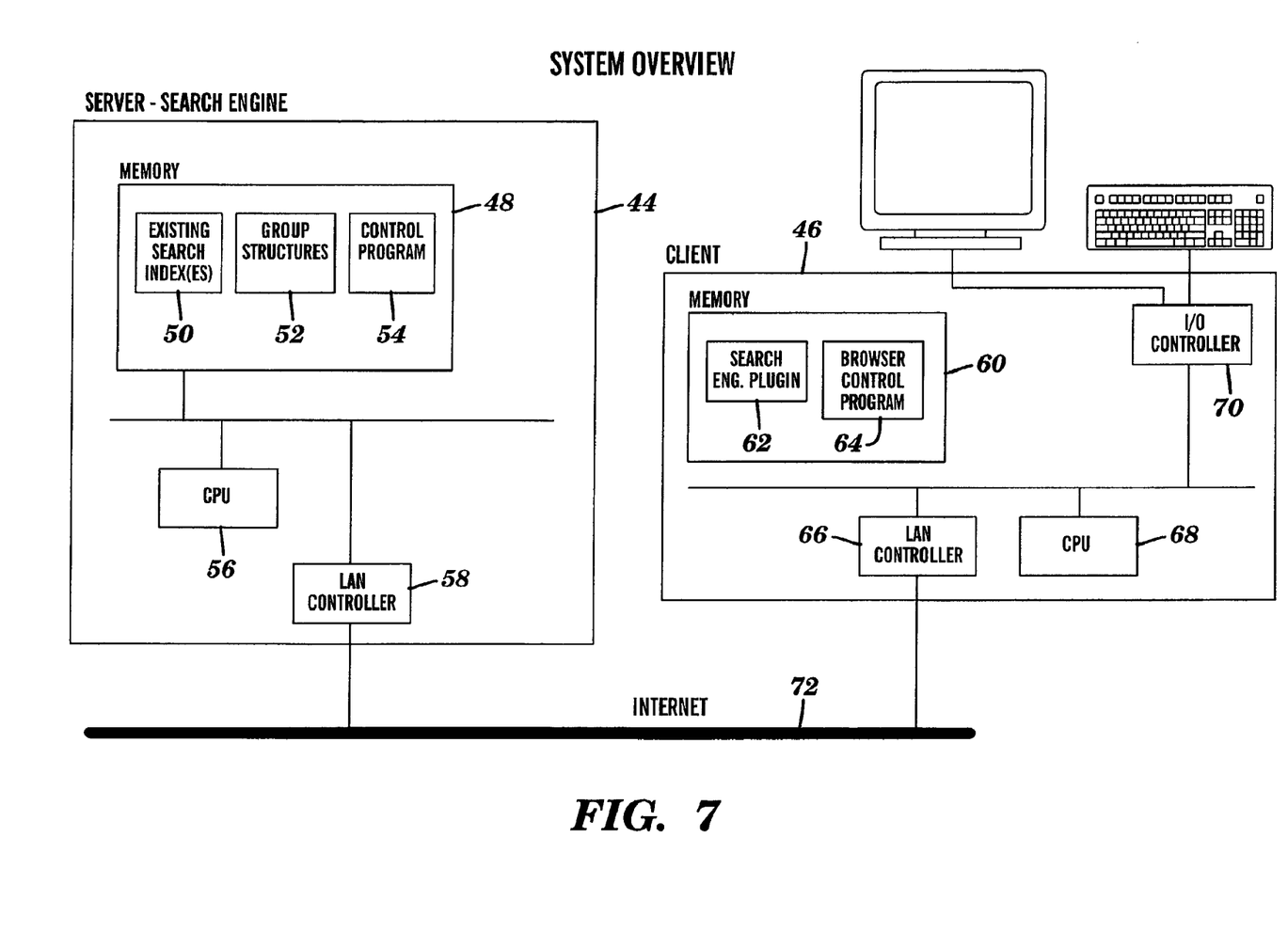
FIG. 7 depicts a system overview of a search engine system in accordance with an embodiment of the present invention.

Referring now to FIG. 7, a system overview of the search engine system is shown comprising a server 44 and a client 46 in communication with each other over a network, such as the internet 72. Server 44 includes a central processing unit 56, a network controller 58, and a memory 48. Stored in memory 48 is a search engine control program 54, existing search index(es) 50 and group structures 52. Search engine control program 54 includes the logic for performing searches based on information in both the existing search index(es) 50 and group indexes stored in the group structures 52. As described below, existing search index(es) 50 comprise data compiled by known search engines to generate a primary search result. Group indexes include nomination and visitation data provided by group members, and are used to refine the primary search result when a search is associated with the group.

Client system 46 includes a central processing unit 68, a network controller 66, an IO controller 70, and a memory 60. Memory 60 includes a search engine plug-in 62 and a browser control program 64. Browser control program 64 provides the user interface for accessing the search engine, as described above. Plug-in 62 provides various functionality, such as causing a nominate button to appear in the browser of a logged in user, as described above. The operation of the search engine system is described in more detail below.

Figure 8:
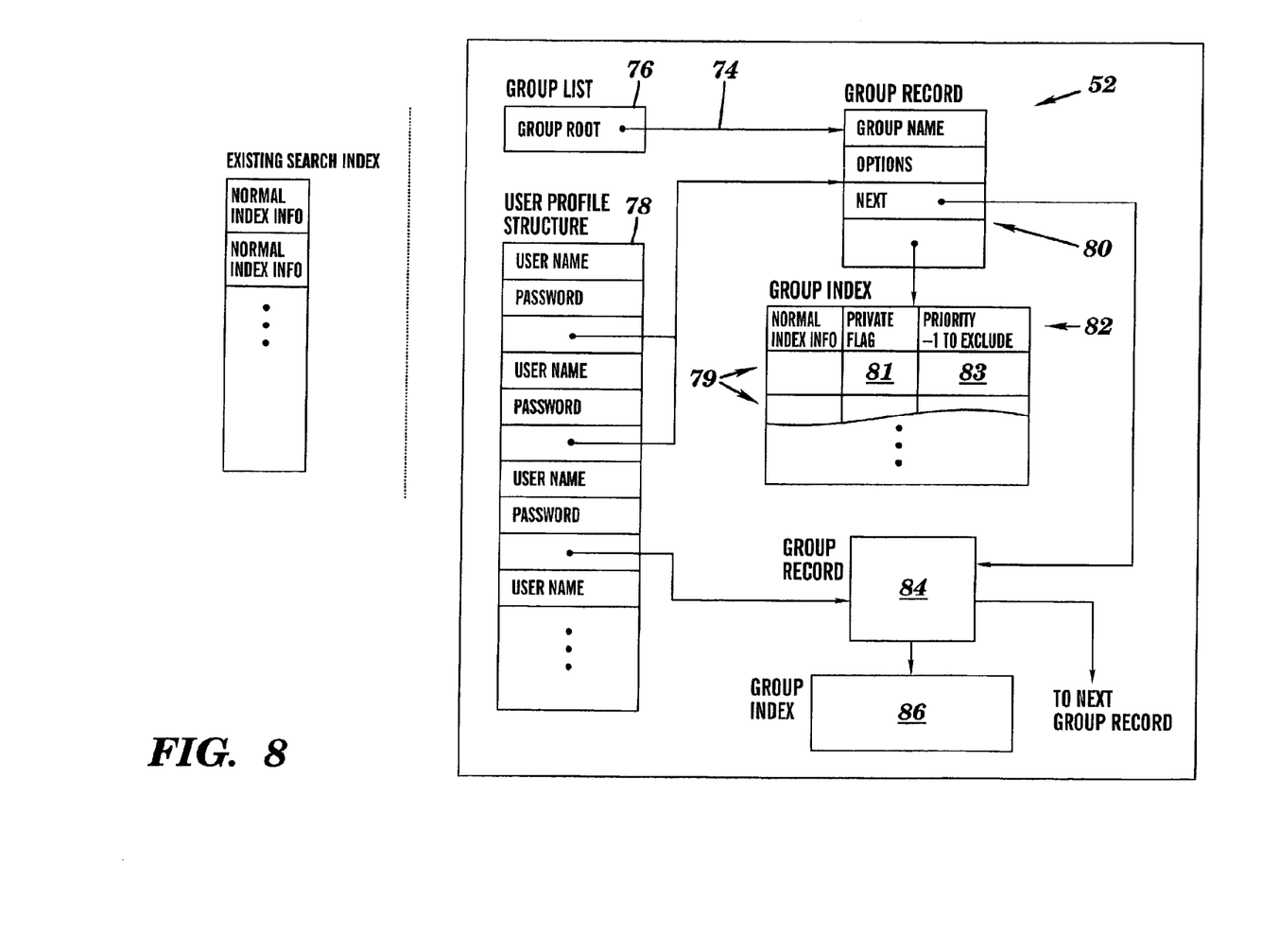
FIG. 8 depicts a group data structure in accordance with an embodiment of the present invention.

FIG. 8 depicts a block diagram of the group structures 52, which are used in conjunction with existing search indexes 50 to expand, prune, or reorder primary search results returned from the existing search indexes. The group structures 52 include a group list 76, a user profile structure 78, a series of group records 80, 84 and a series of group indexes 82, 86. Each of the groups known by the search engine system is kept in a linked list of group records 80, 84. A group root pointer 74 points at the first group record 80 in the linked list. The user profile structure 78 contains an entry for every user and connects the users to each group or groups for which they are a member. Group index 82 comprises the secondary search index for the group when a group-based or restricted group-based search occurs. Group index 82 includes a list of records 79, each containing a registered site and any nomination and visitation data for that site.

In this exemplary implementation, group index 82 contains a private flag field 81 and a priority/exclude/visitation field 83. If a flag is set in the private flag field, then the page should only be added to the search results if the search results are being returned to a group member. The priority/exclude/visitation field 83 may include the priority of a page, whether to exclude the page, or the visitation status of the page. A value of "−1" would mean that the web site should not be displayed with the search results (i.e., it was excluded), a "0" would mean that the site was recently visited by a group member, and a positive integer, e.g., "1," would dictate a site priority. Thus, if a site was nominated multiple times as a high priority, the value in the field could be incremented.

Figure 9:
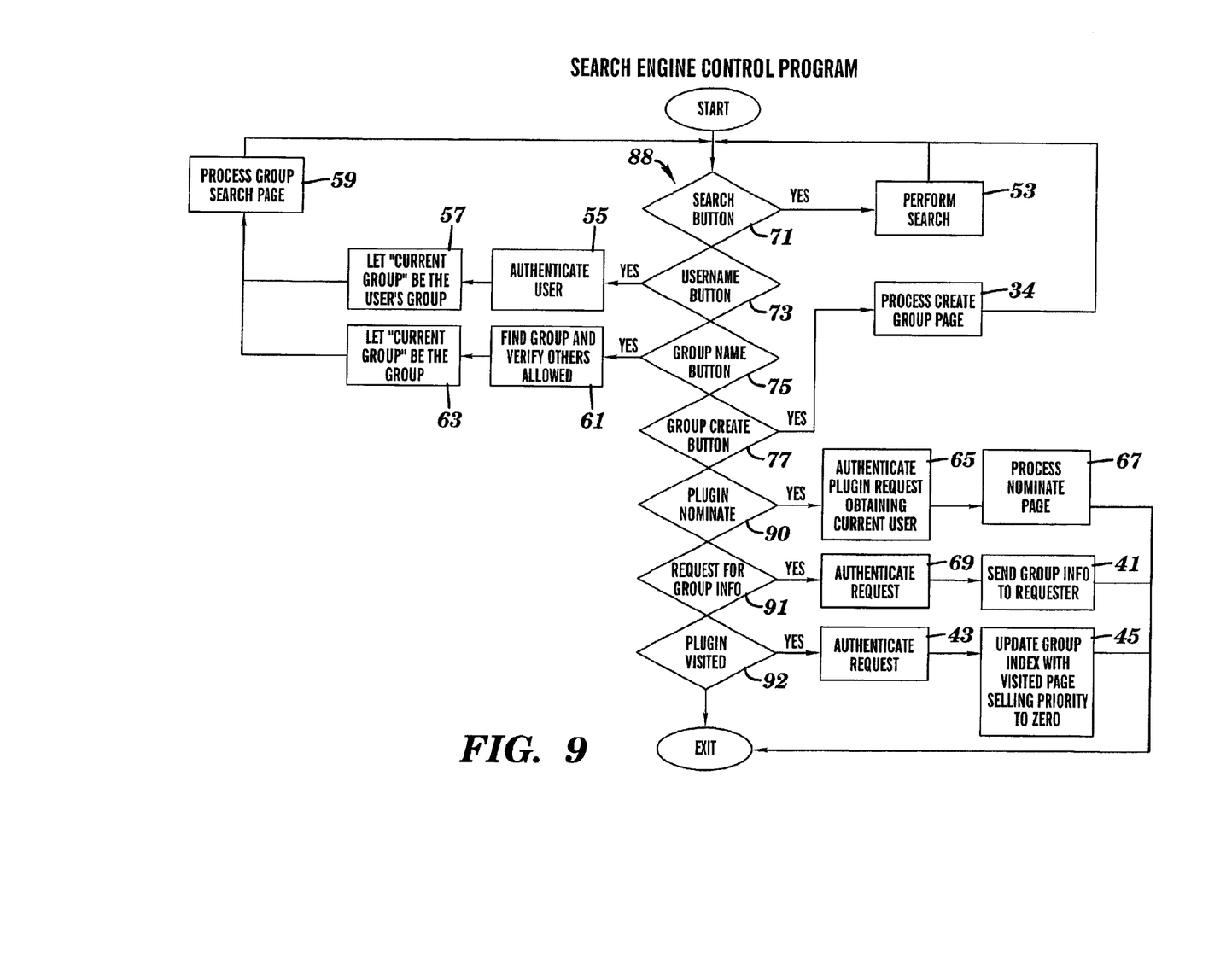
FIG. 9 depicts a flow chart of a search engine control program in accordance with an embodiment of the present invention.

FIG. 9 depicts a flow diagram of a search engine control program 54 showing various actions 88 that may be initiated by client 46. These actions 88 include submitting a search (search button 71), logging in (user name button 73), specifying a group (group name button 75), creating a group (group create button 77), selecting the nominate button (plugin nominate 90), listing group pages (request for group info 91), and visiting a page (plugin visited 92). As shown in the flow diagram, if the search button 71 is pressed, then a search is performed 53. If the user name button 73 is pressed, then the user is authenticated 55, the current group is assigned as the user's group 57, and the group search page is displayed 59. If the group name button 75 is pressed, then the group record and group index for the entered group are located 63 and it is verified that non-group members are allowed 61. The restricted group-based search page is then presented and processed 59. If the group create button 77 is pressed, then the create group page 34 is displayed and processed. If the plug-in nominate button 90 is pressed, then the control program 54 will authenticate the plug-in request 65 and present and process the nominate page 67. If a request for group information button 91 is pressed, then authentication is requested 69 and the group information is sent to the user 41. If the plug-in visited action 92 occurs (i.e., a member visits a registered page), then the action is authenticated 43 and the group index containing the visited page is updated such that the priority is set to zero 45.

Note that the plug-in nominate 90 and plug-in visited 92 actions are available via the plug-in 62 supplied by the search engine to group members. Plug-in nominate 90 is generated when a user visits a page and presses the nominate button as shown in FIG. 5. The plug-in visited action occurs when a group member visits a particular page. Similarly, the request for group information button 91 may include, for example, information regarding nominated pages. Note that the flow chart depicted in FIG. 9 has been shown as a single main flow, but could be implemented by many separate routines. Moreover, more actions 88 could be added.

For example, more detailed information regarding group member surfing habits could be collected and analyzed. For instance, the system could include automatic registration of commonly visited sites into the group's list of nominated sites. Automatically registered sites could be categorized as second tier sites, behind those sites explicitly registered by members of a group. Sites could be categorized automatically based on inferences from how visited sites were used. The ranking of these automatically registered sites can be based on how long users stayed at a site, how many links were clicked from that site, how often users came back to that site, how much merchandise was ordered from that site, and so on. This option could also be turned off in the event a user did not want information gathered.

Figure 10:
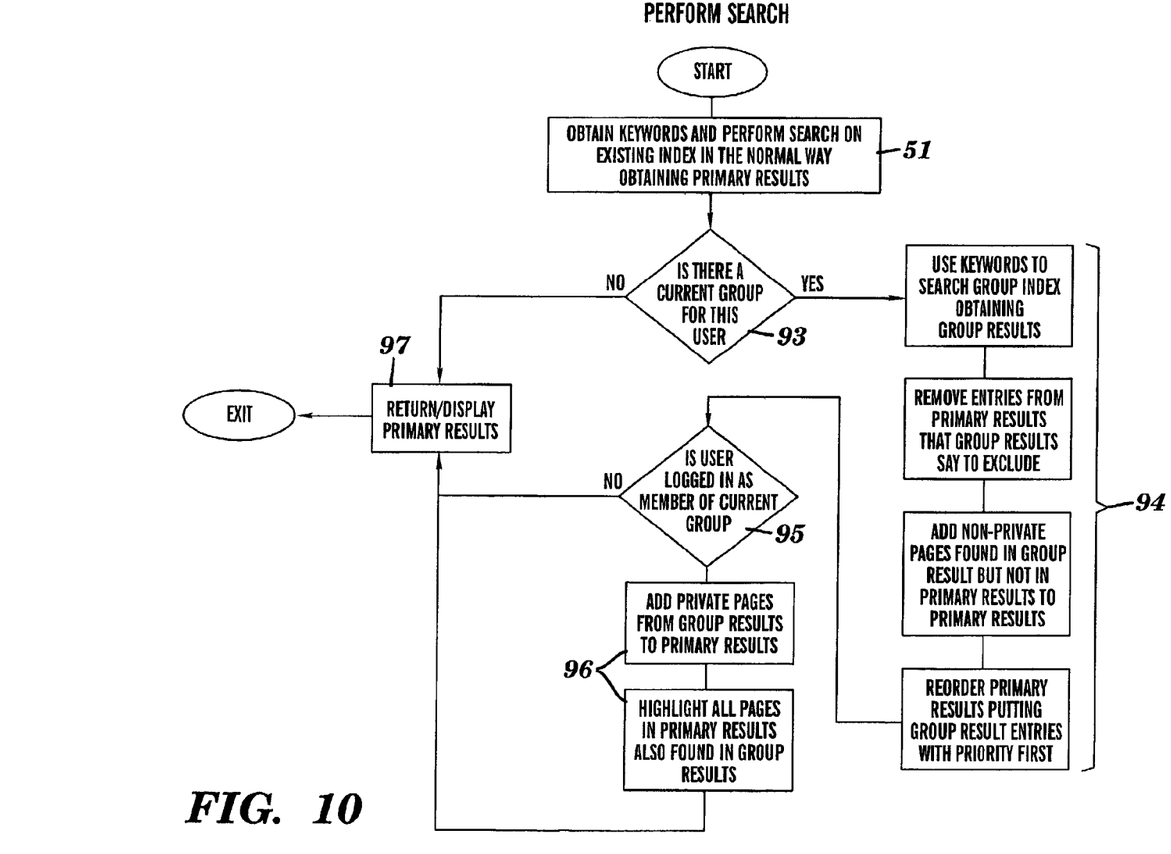
FIG. 10 depicts a flow chart of a search in accordance with an embodiment of the present invention.

Referring now to FIG. 10, a search flow chart is presented that shows how the group index 82 functions with an existing search index 50. First, key words are obtained and a search is performed on the existing index in a known manner to obtain a set of primary results 51. If there is a "current group" for the user (i.e., the user specified a group-based or restricted group-based search) 93 then a series of steps 94 are taken, including: key words are used to search the group index 82 to obtain group results; entries from the primary results are removed if the group results say to exclude; non-private pages found in the group results but not in the primary results are added to the primary results; and primary results are reordered such that group result entries with priority are listed first. If there is not a current group for the user, then the primary results 51 are returned and displayed 97.

Next, if the user is logged in as a member of the current group 95 (i.e., performed a group-based search), then private pages from the group results are added to the primary results and all pages in the primary results that are also found in the group results are highlighted 96 and returned and displayed 97. If the user performed a restricted group-based search, then the above steps 96 are skipped and the results are returned and displayed 97.

Figure 11:
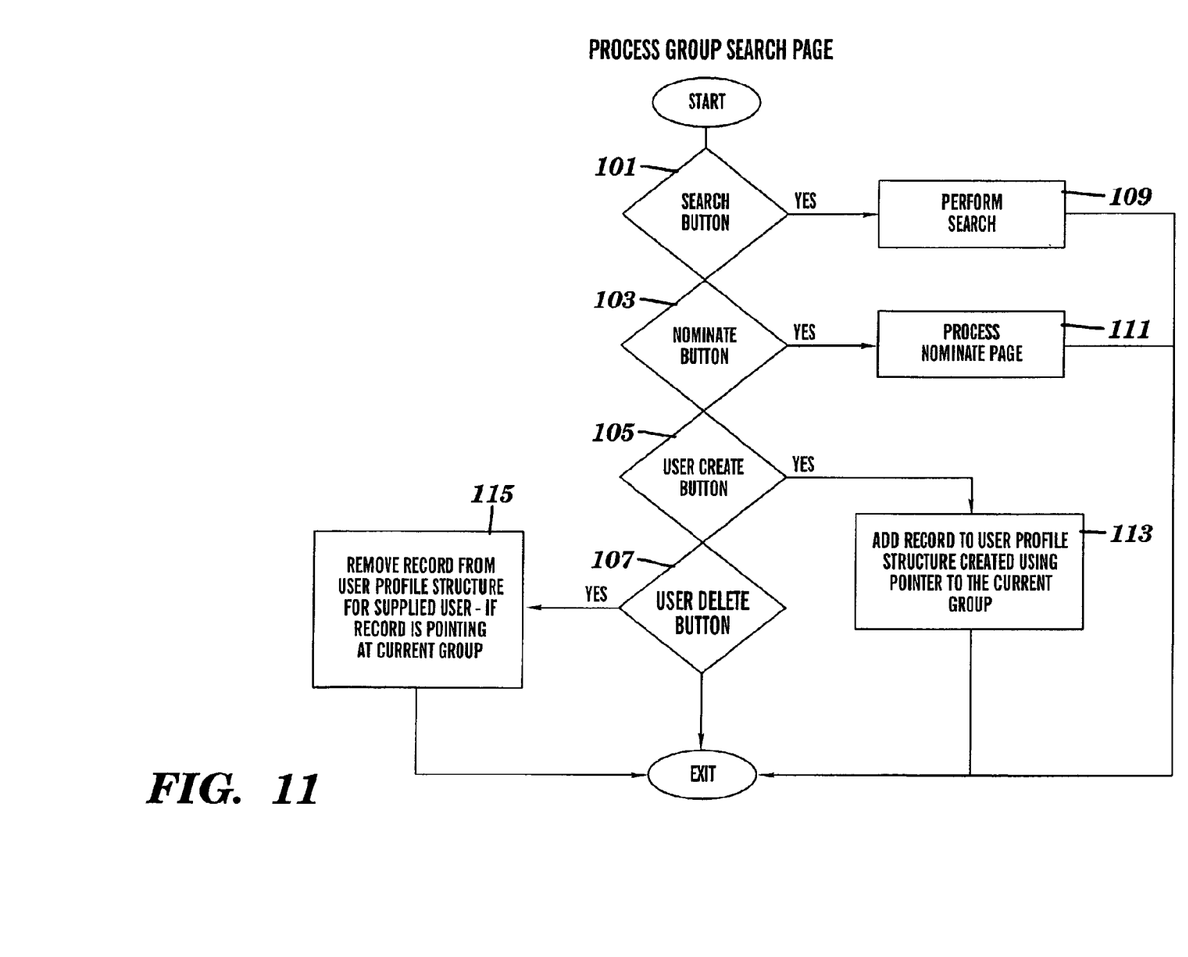
FIG. 11 depicts a flow chart of a group search page process in accordance with an embodiment of the present invention.

Referring now to FIG. 11, a flow chart showing the processing of the group search page 20 (FIG. 2) is depicted.

As shown, four actions are available, including pressing a search button 101, pressing a nominate button 103, pressing a user create button 105, and pressing a user delete button 107. If the search button is pressed 101, then a search is performed 109. If the nominate button 103 is pressed, then the nominate page 30 (FIG. 3) is displayed and processed 111. If the user create button is pressed 105, then a record is added to the user profile structure 78 using a pointer to the current group 113. If the user delete button is pressed 107, then a record is removed from the user profile structure 78 for the supplied user, if the record is pointing at the current group 115.

Figure 12:
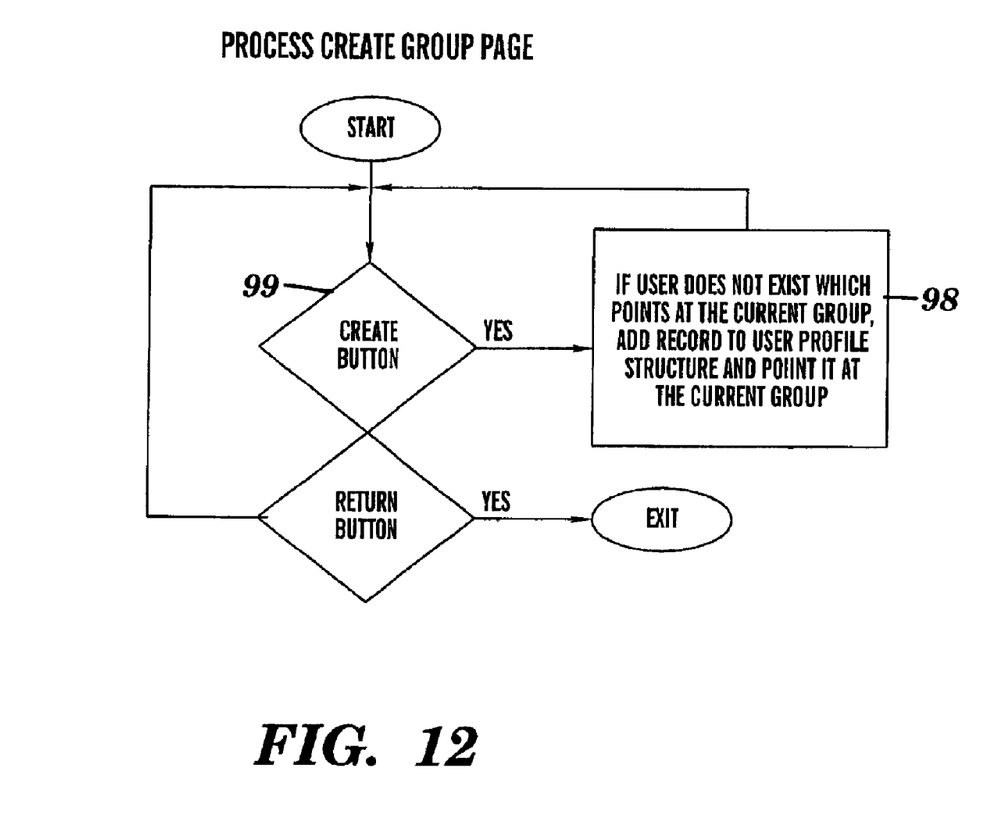
FIG. 12 depicts a flow chart of a group page creation process in accordance with an embodiment of the present invention.

Referring now to FIG. 12, a flow chart is shown for creating a new user. In this case, if the create button 99 is pressed, a record is added to the user profile structure that points at the current group if a user does not exist that points at the current group 98.

Figure 13:
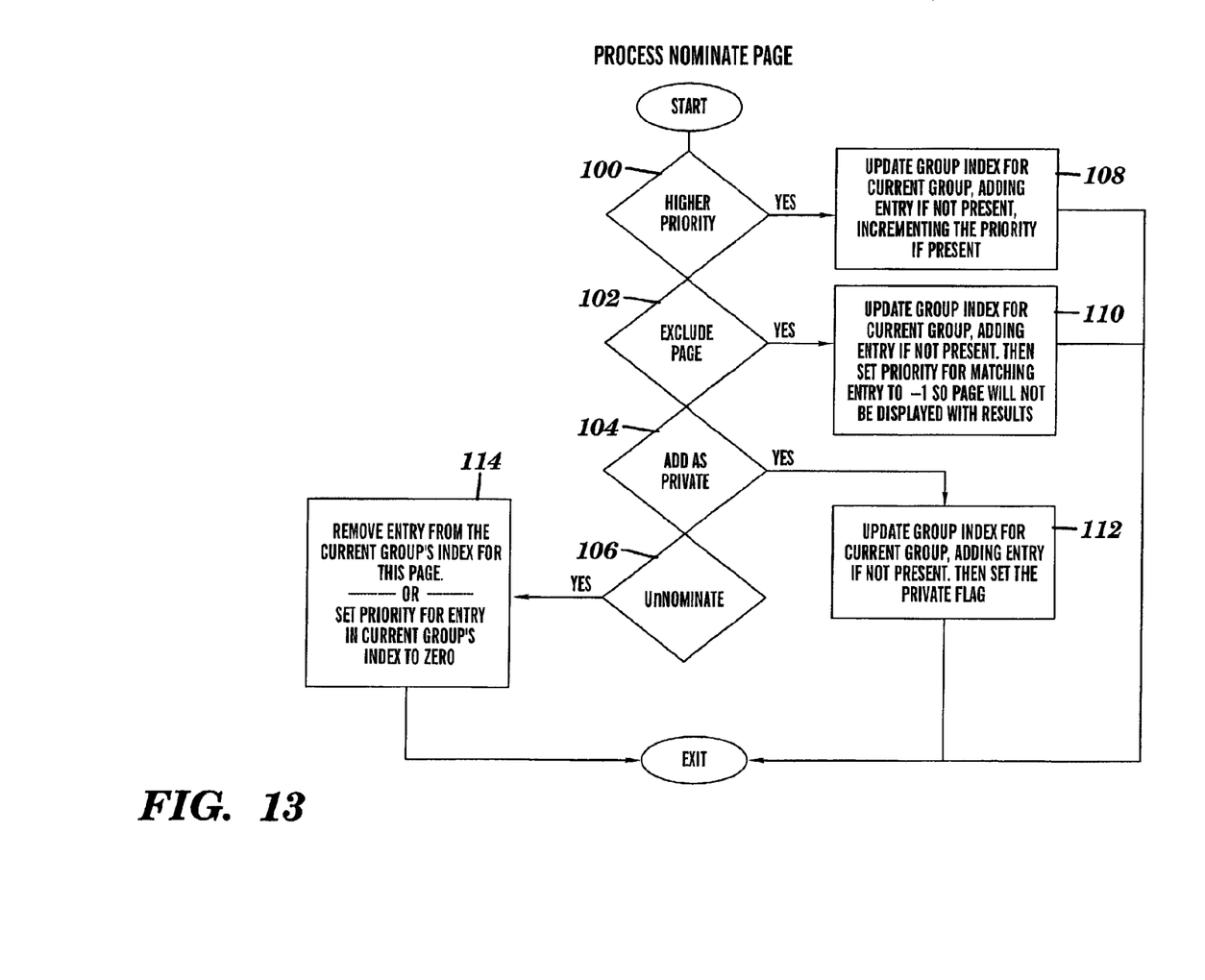
FIG. 13 depicts a flow chart of a nominate page process in accordance with an embodiment of the present invention.

Referring now to FIG. 13, a nominate page flow chart is shown for generating nomination data. In this case, four nomination options are shown including setting a page to a high priority 100, excluding a page 102, adding a page as private 104, and un-nominating a page 106. If the page is selected to be set to a higher priority 100, the group index for the current group is updated (i.e., the entry is added if it is not present or, if present, the priority is incremented) 108. If the page excluded action is taken 102, the group index 82 for the current group is updated 110 (i.e., the entry is added if it is not present, and priority value 83 is set to −1). If the page is added as private 104, then the group index for the current group is updated, adding the entry if not present 112 (i.e., the private flag 81 is set). If the page is un-nominated 106, then the entry is removed from the current group's index for the page or the priority for the entry in the current group's index is set to zero 114.

Figure 14:
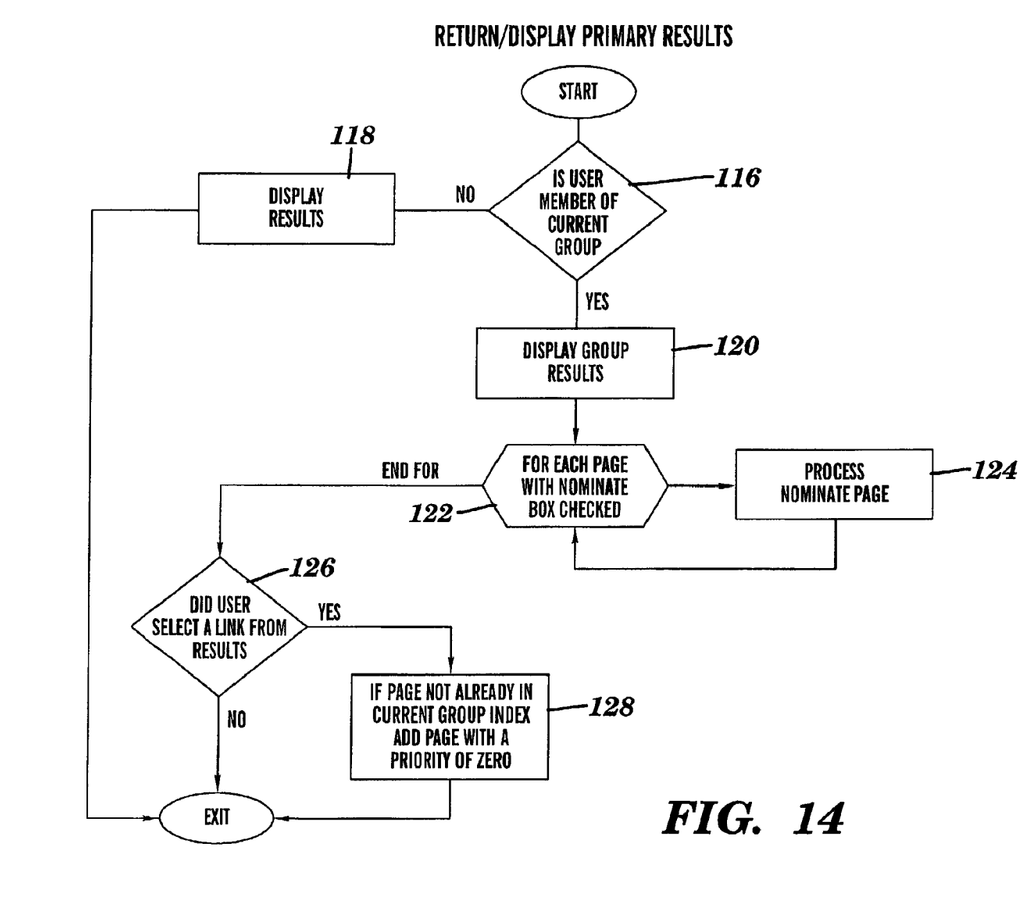
FIG. 14 depicts a flow chart of a search result display in accordance with an embodiment of the present invention.

Referring now to FIG. 14, a flow chart depicting the return of primary search results is shown. If the user is not a member of the current group 116, then results are simply displayed 118. If the user is a member of the current group, then the results are displayed 120. Then, for each page for which the nominated box is checked 122, the nominate page is processed 124. Finally, if the user selected a link from the results 126, and if the page was not already in the current group index, then the page is added with a priority of zero 128.

In addition to the functionality described above, the search engine system could be implemented with the capability for an end-user to export a group-based search from one search engine, e.g., Yahoo!™, to another, e.g., Google™. Moreover, separate search engines could be allowed to: (1) exchange information such as lists of registered members, (2) add names that are in one group but are not in another, etc.

Additional functionality could include the ability to store personalized group-based information on the client (e.g., on a PC, PDA, wireless phone, etc.). This storage could utilize, but not be limited to, such technologies as XML/HTML/WML format. The group-based personalization information stored on the device could then be transmitted to the search engine whenever a session was initiated.

The system could also provide the capability for third party applications to access group information. Each search engine could have its own list of groups and associated information. This information would most likely be protected and kept in various secured directories, e.g., using Lightweight Directory Access Protocol (LDAP). This would allow various applications (most likely web applications running on the local server with the search engine or other authorized remote server) to access group information. This information may have known interfaces supplied by the search engine or use various standard messaging technologies using other industry standards such as XML for the data exchange. Each search engine may also choose to use a private-nonstandard interface to increase security.

It is understood that the components of the present invention can be realized in hardware, software, or a combination of hardware and software. Any kind of computer system—or other apparatus adapted for carrying out the methods described herein—is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. Aspects of the present invention can also be embedded in a computer program product, which comprises all the features enabling the implementation of the methods described herein, and which—when loaded in a computer system—is able to carry out these methods. Computer program, software program, program, module, mechanism or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A group-based search engine for locating web pages, comprising:
    a system for associating a user group with a web search;
    a search system for generating a list of search results ordered by a ranking in response to the web search, wherein the ranking is based on at least one nomination previously made by a member of the user group;
    a visitation system for visiting a search result generated by the search system; and
    a nomination system for nominating a web page, wherein the nomination system is independent from the visitation system.

2. The group-based search engine of claim 1, further comprising a system for logging in as a member of the user group.

3. The group-based search engine of claim 1, wherein the nominating system causes the nominated web page to have an increased priority in the ranking of future search results.

4. The group-besed search engine of claim 1, wherein the nominating system causes the nominated web page to be excluded from future search results.

5. The group-based search engine of claim 1, wherein the nominating system causes the nominated web page to be listed in future search results for logged-in user group members only.

6. The group-based search engine of claim 1, further comprising a system for highlighting search results in the list that point to web pages recently visited by other user group members.

7. The group-based search engine of claim 1, further comprising a system for un-nominating a selected web page.

8. The group-based search engine of claim 1, further comprising a system for creating a new user group.

9. The group-based search engine of claim 1, further comprising a system for adding new members to the user group.

10. A program product stored on a recordable medium for interfacing with a search engine to return a list of search results, comprising:
    means for registering with a group;
    means for submitting a search string to the search engine;
    means for viewing the list of search results based on a ranking, wherein any search result previously nominated by a group member as a high priority is ranked above un-nominated search results;
    means for visiting a search result; and
    means for nominating a current search result from the list of search results, wherein the nominating means is independent of the visiting means.

11. The program product of claim 10, wherein said means for nominating a current search result includes means for nominating the search result as a high priority.

12. The program product of claim 10, wherein said means for nominating a current search result includes means for excluding the current search result from a future list of search results.

13. The program product of claim 10, wherein said means for nominating a current search result includes means for identifying the current search result as available only to members of the group.

14. The program product of claim 10, wherein the search engine may comprise a plurality of search engines.

15. The program product of claim 10, wherein the means for submitting a search string includes means for associating the search string with the group.

16. The program product of claim 10, wherein the means for viewing the list of search results includes means for viewing a highlighted search result, wherein the highlighted search result identifies a web page previously visited by a member of the group.

17. search system for performing group-based searches, comprising:
    a client system having a browser and a search engine plug-in, wherein the search engine plug-in allows group members to generate nomination data by nominating web pages, wherein the nomination data is generated independently of visitation data generated when a users visits a located web page; and
    a server having a control program and a group structure for storing nomination data, wherein the control program generates a primary search result list based on a search index, and further refines the search result list based on the stored nomination data.

18. The search system of claim 17, wherein the plug-in causes a nominate button to be displayed with each web page displayed by the browser.

19. The search system of claim 17, wherein the nomination data includes selected web pages nominated as having a higher priority, and the control program refines the search result list by listing the selected web pages first.

20. The search system of claim 17, wherein the nomination data includes selected web pages nominated as excluded, and the control program refines the search result list by not listing the selected web pages.

21. The search system claim 17, wherein the nomination data includes selected web pages nominated as private, and the control program refines the search result list by not listing the selected web pages for non-members.

22. The search system of claim 17, wherein the group structure further includes visitation data regarding which web pages group members visited.

23. The search system of claim 22, wherein the control program causes a result in the primary search result list to be highlighted based on the visitation data.

24. A method for performing a group-based search, comprising:
    providing a browser and a search engine plug-in on a client system;
    logging in as a member of a group using the browser;
    submitting a search request to a search engine server;
    searching a search index and returning a primary search result list; and
    refining the primary search result list based on nomination data collected from members of the group, wherein the nomination data is generated independently of visitation data generated when a users visits a located web page from a search result list.

25. The method of claim 24, further comprising:
    nominating a web page at the client system;
    transmitting nomination data to the search engine server; and
    storing the nomination data in a group structure.

26. The method of claim 25, wherein nominating the web page includes indicating a higher priority for the web page and wherein refining the primary search result list includes listing the nominated web page with a higher priority.

27. The method of claim 25, wherein nominating the web page includes indicating the web page as excluded, and wherein refining the primary search result list includes excluding the web page from the primary search result list.

28. The method of claim 25, wherein nominating the web page includes indicating the web page as private, and wherein refining the primary search result list includes excluding the web page from the primary search result list for non-members.

29. The method of claim 24, further comprising the further steps of:
    tracking web pages visited by group members; and
    wherein the step of refining the primary search result list includes highlighting visited web pages.

* * * * *